United States Patent
Nagayasu et al.

(10) Patent No.: US 8,043,989 B2
(45) Date of Patent: Oct. 25, 2011

(54) DESULFURIZATION SYSTEM FOR HYDROCARBON FUEL

(75) Inventors: Yoshiyuki Nagayasu, Yokohama (JP); Atsushi Segawa, Yokohama (JP); Kazunori Miyazawa, Yokohama (JP); Yoshihiro Kobori, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 12/530,110

(22) PCT Filed: Mar. 4, 2009

(86) PCT No.: PCT/JP2008/054239
§ 371 (c)(1),
(2), (4) Date: Sep. 4, 2009

(87) PCT Pub. No.: WO2008/149587
PCT Pub. Date: Dec. 11, 2008

(65) Prior Publication Data
US 2010/0160152 A1    Jun. 24, 2010

(30) Foreign Application Priority Data
Mar. 7, 2007 (JP) ................ 2007-056905

(51) Int. Cl.
*B01J 29/06* (2006.01)
*B01J 8/00* (2006.01)
*C07C 7/148* (2006.01)

(52) U.S. Cl. ............. 502/64; 502/60; 502/63; 502/67; 502/69; 502/79; 502/407; 502/414; 502/517; 423/244.02; 423/244.04; 208/246; 208/248; 585/820

(58) Field of Classification Search .......... 502/60, 502/63, 64, 67, 69, 79, 407, 414, 517; 423/244.02, 423/244.04; 208/246, 248; 585/820
See application file for complete search history.

(56) References Cited

U.S. PATENT DOCUMENTS

| 5,146,039 A | 9/1992 | Wildt et al. |
| 6,875,410 B2 * | 4/2005 | Satokawa et al. .......... 423/244.1 |
| 2001/0014304 A1 | 8/2001 | Satokawa et al. |
| 2004/0057890 A1 * | 3/2004 | Satokawa et al. ........ 423/244.04 |
| 2006/0108262 A1 * | 5/2006 | Takatsu et al. ................ 208/189 |
| 2006/0283780 A1 * | 12/2006 | Spivey et al. ................. 208/213 |
| 2007/0196258 A1 | 8/2007 | Lee et al. |

FOREIGN PATENT DOCUMENTS

| EP | 1 121 977 A2 | 8/2001 |
| JP | 2-073887 A | 3/1990 |
| JP | 2001-286753 A | 10/2001 |
| JP | 2001-305123 A | 10/2001 |
| JP | 2003-238977 A | 8/2003 |
| JP | 2004-168648 A | 6/2004 |
| JP | 2004-277747 A | 10/2004 |
| JP | 2005-060674 A | 3/2005 |
| JP | 2006-277980 A | 10/2006 |
| JP | 2007-217694 A | 8/2007 |

OTHER PUBLICATIONS

S. Kasaoka et al.; "Adsorption of Dimethyl Sulfide with Various Ion-exchanged Y-type Zeolites"; The Chemical Society of Japan; vol. 12; pp. 1945-1950; (1981).
EP Supplemental Search Report issued Apr. 13, 2011 in counterpart EP Application No. 08 82 5881.

* cited by examiner

*Primary Examiner* — Elizabeth Wood
(74) *Attorney, Agent, or Firm* — Panitch Schwarze Belisario & Nadel LLP

(57) ABSTRACT

A system is provided for desulfurizing a hydrocarbon fuel containing a light amount of methanol and a slight amount of water. The desulfurization system uses a Y-type zeolite-based desulfurizing agent containing at least copper arranged upstream of the system and an X-type zeolite-based desulfurizing agent containing at least silver arranged downstream of the system and thus can maintain desulfurization effect for a long period of time.

6 Claims, 1 Drawing Sheet

DESULFURIZATION SYSTEM FOR HYDROCARBON FUEL

CROSS-REFERENCE TO RELATED APPLICATIONS

This application is a Section 371 of International Application No. PCT/JP2008/054239, filed Mar. 4, 2008, which was published in the Japanese language on Dec. 11, 2008, under International Publication No. WO 2008/149587 A1 and the disclosure of which is incorporated herein by reference.

BACKGROUND OF THE INVENTION

The present invention relates to desulfurization systems for a hydrocarbon fuel containing a slight amount of methanol. The present invention also relates to fuel cell systems using a hydrocarbon fuel containing a slight amount of methanol as the raw fuel for the cell systems.

In a fuel cell system, in particular a proton-exchange membrane fuel cell system (PEFC) that has been drastically improved in recent years, it is essential in the process of producing hydrogen from a hydrocarbon raw fuel to remove sulfur compounds contained therein to an extremely low level in order to allow the following catalytic reaction processes such as reforming, water gas shift, and selective CO oxidation to proceed normally for long periods. Therefore, many of the fuel cell systems are provided with a desulfurization section for removing sulfur compounds contained in a raw fuel by adsorbing or hydrocracking. Eligible desulfurizing agents and catalysts include hydrodesulfurizing agents and sulfur adsorbents. Among these, zeolite-based desulfurizing agents supporting silver or copper by ion-exchange, which can remove sulfur compounds down to an extremely low level under mild conditions that are atmospheric pressure and relatively low temperatures close to room temperature are industrially useful and have been used widely in domestic fuel cell systems using a low boiling point hydrocarbon such as natural gas or LP gas (liquefied petroleum gas) as a raw fuel (see, for example, Patent Documents 1 to 5 and Non-Patent Document 1)

(1) Patent Document 1: Japanese Patent Application Laid-Open Publication No. 2001-286753
(2) Patent Document 2: Japanese Patent Application Laid-Open Publication No. 2001-305123
(3) Patent Document 3: Japanese Patent Application Laid-Open Publication No. 2004-168648
(4) Patent Document 4: Japanese Patent Application Laid-Open Publication No. 2004-277747
(5) Patent Document 5: Japanese Patent Application Laid-Open Publication No. 2-73887
(6) Non-Patent Document 1: "Nihonkagakukaishi", 1981, Vol. 12, pages 1945-1950

However, a slight amount of methanol may often be added in some of the hydrocarbon fuels as the need arises. For example, methanol may be added in an LP gas particularly in order to prevent entrained moisture from freezing during a winter season. It was found that the use of the methanol-added hydrocarbon fuels decreases the performances of the above-described zeolite desulfurizing agent. In the case of coexistence of methanol, the phenomenon of the decreased desulfurization performance is not preferable because the durability of a fuel cell system is impaired. Therefore, a desulfurizing agent has been demanded which has a higher desulfurization performance even though a fuel contains methanol.

Whereas, Patent Document 1 discloses that deposition of silver on a hydrophobic zeolite can obtain a higher desulfurization performance when moisture is mixed in a hydrocarbon fuel. However, the inventors of the present invention have found that the desulfurizing agent of Patent Document 1 exhibits only limited performances if it is used for a hydrocarbon fuel containing methanol.

Therefore, there has been a demand for the development of a desulfurizing agent that is not decreased in performances even if it is used under conditions where a fuel contains methanol and water.

BRIEF SUMMARY OF THE INVENTION

In order to solve the foregoing problems, the inventors of the present invention have carried out an extensive study for the development of a desulfurization system that can maintain the performances of desulfurizing agents for a long period of time in a state where slight amounts of methanol and moisture are mixed in a fuel. As the result, the present invention has been accomplished on the basis of the finding that the foregoing problems can be solved with a system using a Y-type zeolite-based desulfurizing agent containing at least copper arranged upstream of the system and an X-type zeolite-based desulfurizing agent containing at least silver arranged downstream of the system.

That is, the present invention relates to a desulfurization system for a hydrocarbon fuel comprising a Y-type zeolite-based desulfurizing agent containing at least copper arranged upstream of the system and an X-type zeolite-based desulfurizing agent containing at least silver arranged downstream of the system.

The present invention also relates to the foregoing desulfurization system for a hydrocarbon fuel wherein the reaction temperature is 100° C. or lower.

The present invention also relates to the foregoing desulfurization system for a hydrocarbon fuel wherein the hydrocarbon fuel is an LP gas.

The present invention also relates to the foregoing desulfurization system for a hydrocarbon fuel wherein the zeolite-based desulfurizing agent is produced by depositing copper or silver on a zeolite through ion-exchange.

The present invention also relates to a device for producing hydrogen for a fuel cell system using the foregoing desulfurization system for a hydrocarbon fuel.

The present invention also relates to a fuel cell system using the foregoing desulfurization system for a hydrocarbon fuel.

Effects of the Invention

The desulfurization system of the present invention enables desulfurizing agents to maintain their performances for a long period of time in a state where slight amounts of methanol and moisture are mixed in a hydrocarbon fuel.

DETAILED DESCRIPTION OF THE INVENTION

Figure 1:
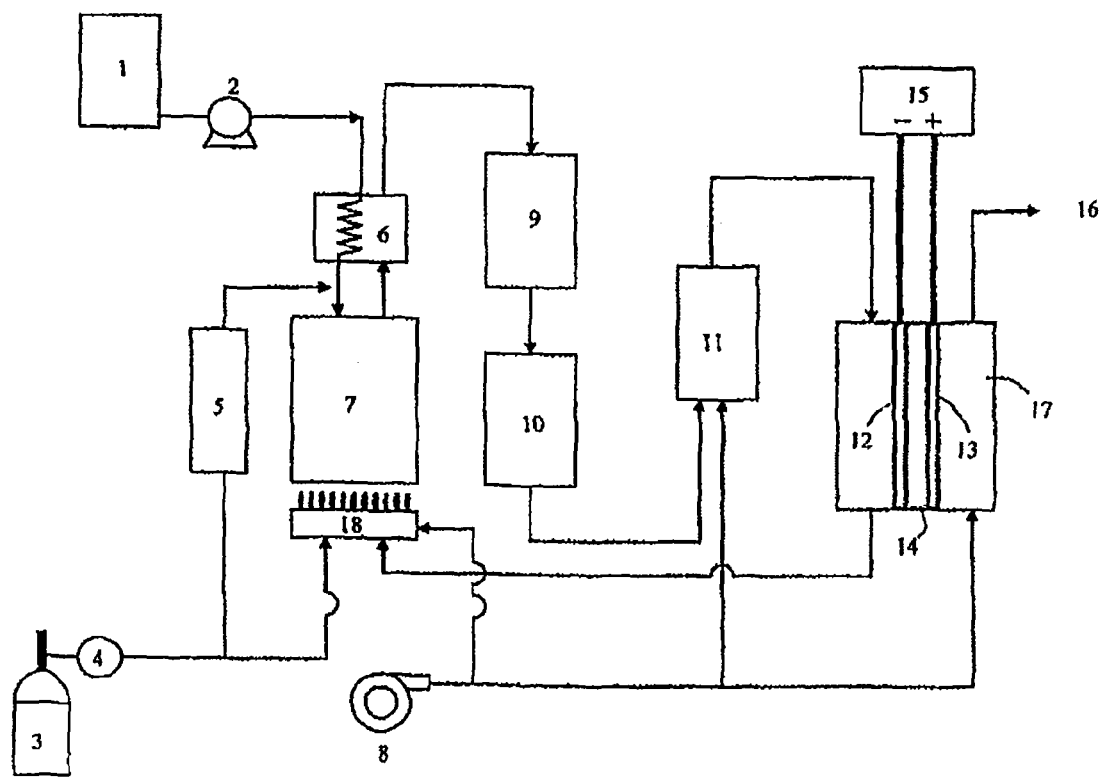
FIG. 1 is a schematic view illustrating an example of the fuel cell system of the present invention.

The present invention will be described in more detail below.

Examples of hydrocarbon fuels that may be used as the raw fuel in the present invention include natural gas, LP gas, naphtha, gasoline and kerosene. Among these, preferred are fuels that are gaseous at normal temperatures and pressures, such as natural gas and LP gas, and more preferred is LP gas. In the present invention, the hydrocarbon fuels are those containing 0.1 mass ppm or more, preferably 0.5 mass ppm or more of sulfur compounds. There is no particular restriction on the upper limit of the sulfur compound content. However, it is preferably 200 mass ppm or less, more preferably 50 mass ppm or less. Some of the sulfur compounds are mixed in the course of production of a hydrocarbon fuel and the others are artificially mixed as odorants. According to the present invention, both of the sulfur compounds can be effectively removed.

Description will be given of the types and concentrations of sulfur compounds contained in various hydrocarbon fuels. Natural gas contains very little sulfur compounds at the refinery stage but often incorporates lower mercaptans such as ethyl mercaptan, isopropyl mercaptan, and t-butyl mercaptan and lower sulfides such as dimethyl sulfide, ethylmethyl sulfide and tetrahydrothiophene as odorants for gas leak detection. These compounds are usually contained at a sulfur concentration of 0.1 to 10 mass ppm (the weight of sulfur atoms per weight of the sulfur-containing hydrocarbon). For LP gas, in addition to these components to be incorporated in natural gas, it also contains lower mercaptans such as methyl mercaptan, ethyl mercaptan and propyl mercaptan, lower sulfides such as dimethyl sulfide, components such as carbonyl sulfide, disulfides to which mercaptans are oxidatively coupled, all of which are incorporated during the process of producing LP gas.

The sulfur concentration of the LP gas to be used is usually on the order of 0.1 to 10 mass ppm. However, when LP gas is taken out from an LP gas cylinder, it is known that the sulfur concentration varies depending on the remaining LP gas amount in the cylinder. Therefore, the sulfur concentration may exceed 100 mass ppm for a short time if much sulfur is contained. For naphtha and kerosene, which are large in average molecular weight, it is not necessary to add odors because they are liquid at normal temperatures. However, the sulfur concentration of the raw materials is high, and the sulfur compounds have each a high molecular weight and vary in type in a wide range. The sulfur compounds include mercaptans and sulfides as well as thiophenes, substituted thiophenes, and benzothiophenes. The sulfur content ranges from several mass ppm to several dozen mass ppm.

Hydrocarbon fuels used in the present invention are those containing methanol in addition to the above-mentioned sulfur compounds. The methanol content is usually 1 mass ppm or less, for example, from 1 to 10,000 mass ppm, preferably from 10 to 5,000 mass ppm, more preferably 100 to 2,000 mass ppm. In particular for LP gas, methanol is artificially added therein in order to avoid entrained moisture from freezing during a winter season and causing disadvantages that piping or a switching regulator are clogged. Methanol is usually added in an amount of 100 to 5,000 mass ppm, preferably 300 to 2,500 mass ppm on the basis of the liquid LP gas in a cylinder. For a fuel cell system wherein LP gas is drawn out as it is liquid and then gasified outside of the cylinder, the methanol concentration of the hydrocarbon fuel to be introduced into the fuel cell system will be equal to the methanol concentration of the liquid LP gas.

Whereas, for a fuel cell system wherein the LP gasified in the cylinder is introduced thereinto, the methanol concentration of the gasified LP gas does not always coincide with the methanol concentration of the liquid LP gas. However, an LP gas containing methanol in a concentration of 1 to 10,000 mass ppm, preferably 10 to 5,000 mass ppm, more preferably 100 to 2,000 mass ppm is introduced into a fuel cell system.

Hydrocarbon fuels used in the present invention are those containing water in addition to the above-mentioned sulfur compounds and methanol. The water content is usually 1 mass ppm or more, for example, from 1 to 500 mass ppm, preferably 2 to 200 mass ppm.

In the present invention, the desulfurizing agent used upstream of the system is a zeolite-based desulfurizing agent containing copper. The zeolite used upstream of the system may be any of various zeolites such as those of A-type and faujasite-type. Preferred is a Y-type zeolite.

The amount of copper to be deposited is from 3 to 20 mass percent, preferably from 5 to 15 mass percent, on the basis of the total mass of the desulfurizing agent. If the amount is less than 3 mass percent, sufficient desulfurization performance is not obtained. If the amount is more than 20 mass percent, desulfurization performance is not exhibited as balanced with the amount of copper.

Ion-exchange is preferably used to deposit copper. Various types of zeolites such as sodium-, ammonium- and hydrogen-type zeolites may be used for ion exchange. However, sodium-type zeolites are most preferably used. Copper is usually prepared in the form of cation dissolved in water. Specific examples include aqueous solutions of copper sulfide, copper nitrate, copper chloride and copper acetate and aqueous solutions of copper complex ions such as copper amine complex ion. The copper concentration of such aqueous solutions containing copper ions is usually from 0.1 to 10 mass percent, preferably from 0.5 to 5 mass percent.

There is no particular restriction on the ion-exchange method. In general, the above-described zeolite is added in the aforesaid solution containing cationic copper and then ion-exchanged at a temperature of usually 0 to 90° C., preferably 20 to 70° C. for one hour to several hours preferably while being stirred. Thereafter, the solid is separated by way of filtering and washed with water. The solid is dried at a temperature of 50 to 200° C., preferably 80 to 150° C. This ion-exchange may be repeated. If necessary, the resulting product may be calcined at a temperature of 200 to 600° C., preferably 300 to 500° C. for several hours. In this manner, the intended copper ion-exchanged zeolite can be produced.

The copper-supporting zeolite prepared as above may be molded by a conventional method such as extrusion, tablet compression, rolling granulation, and spray drying and if necessary calcination, using alumina, silica, clay mineral or a precursor thereof such as boehmite as a suitable binder. Alternatively, a method is also preferably used wherein a zeolite is molded in advance and then ion-exchanged as described above.

In the present invention, the desulfurizing agent used downstream of the system is a zeolite-based desulfurizing agent containing silver. The zeolite used downstream of the system may be any of various zeolites such as those of A-type and faujasite-type. Preferred is an X-type zeolite.

The amount of silver to be deposited is preferably from 10 to 30 mass percent, more preferably from 15 to 25 mass percent, on the basis of the total mass of the desulfurizing agent. If the amount is less than 10 mass percent, sufficient desulfurization performance is not obtained. If the amount is more than 30 mass percent, desulfurization performance is not exhibited as balanced with the amount of silver.

Ion-exchange is preferably used to deposit silver. Various types of zeolites such as sodium-, ammonium- and hydrogen-type zeolites may be used for ion-exchange. However, sodium-type zeolites are most preferably used. Silver is prepared in the form of cation dissolved in water. Specific examples include aqueous solutions of silver nitrate and silver perchlorate and an aqueous solution of silver amine complex ion. Most preferred is an aqueous solution of silver nitrate. The silver concentration of such aqueous solutions containing silver ion is usually from 0.5 to 10 mass percent, preferably from 1 to 5 mass percent.

There is no particular restriction on the ion-exchange method. In general, the above-described zeolite is added in the aforesaid solution containing cationic silver and then ion-exchanged at a temperature of usually 0 to 90° C., preferably 20 to 70° C. for one hour to several hours preferably while being stirred. Thereafter, the solid is separated by way of filtering and washed with water. The solid is dried at a temperature of 50 to 200° C., preferably 80 to 150° C. This ion-exchange may be repeated. If necessary, the resulting product may be calcined at a temperature of 200 to 600° C., preferably 250 to 400° C. for several hours. In this manner, the intended silver ion-exchanged zeolite can be produced.

The silver-supporting zeolite prepared as above may be molded by a conventional method such as extrusion, tablet compression, rolling granulation, and spray drying and if necessary calcination, using alumina, silica, clay mineral or a precursor thereof such as boehmite as a suitable binder. Alternatively, a method is also preferably used wherein a zeolite is molded in advance and then ion-exchanged as described above.

In the present invention, the copper ion-exchanged zeolite and silver ion-exchanged zeolite as prepared above are arranged as desulfurizing agents, upstream and downstream of the system, respectively to carry out desulfurization.

These copper ion-exchanged zeolite and silver ion-exchanged zeolite can be suitably used to remove sulfur compounds contained in hydrocarbon fuels, preferably those such as natural gas and LP gas, which are gaseous at normal temperatures and normal pressures, more preferably LP gas. Desulfurization is preferably carried out under conditions where the hydrocarbon fuels are gasified. The desulfurization temperature is preferably 100° C. or lower, for example, selected within the range of −50 to 100° C., more preferably −20 to 80° C. A desulfurization temperature of higher than 100° C. is not preferable because deformation of copper and silver is facilitated under conditions where the hydrocarbon fuel contains methanol. A desulfurization temperature of lower than −50° C. is not preferable because a sufficient activity is not exhibited.

In the case of using a hydrocarbon fuel such as natural gas or LP gas, which is gaseous at normal temperatures and normal pressures, the GHSV is selected within the range of 10 to 100,000 $h^{-1}$, preferably 100 to 10,000 $h^{-1}$. A GHSV of lower than 10 $h^{-1}$ is not preferable because the desulfurizing agents are used more than needs, resulting in an excessively large desulfurizer though a sufficient desulfurization performance is obtained. Whereas, a GHSV of higher than 100,000 $h^{-1}$ is not also preferable because a sufficient desulfurization performance is not obtained. Alternatively, a liquid fuel may be used. In this case, the WHSV is selected within the range of 0.1 to 1,000 $h^{-1}$.

Pressure for desulfurization is selected within the range of usually normal pressures to 1 MPa (gauge pressure, hereinafter the same), preferably normal pressures to 0.5 MPa, more preferably normal pressure to 0.2 MPa. However, desulfurization can be carried out most preferably under atmospheric pressure.

In the desulfurization system of the present invention, the above-described zeolite-based desulfurizing agents are usually filled into desulfurizers arranged in a circulation-type reaction pipe. The circulation-type reaction pipe may be of any conventional type or shape and may or may not be provided with temperature and pressure adjusting functions. If desulfurization is insufficient with the above-described desulfurizing agents, other desulfurizing agents may be arranged in the following stage. The other desulfurizing agents may be those containing at least one type selected from the group consisting of nickel, chrome, manganese, cobalt, copper, silver, zinc and iron. However, preferred are those containing nickel.

The desulfurization system of the present invention may be used as a part of a hydrogen production device for a fuel cell system. The hydrogen production device usually comprises a desulfurization section for removing sulfur compounds from a hydrocarbon fuel, a reforming section for decomposing the hydrocarbon fuel in coexistence of steam and if necessary oxygen, a shift section for converting carbon monoxide mixing in hydrogen generated in the reforming section to carbon dioxide and hydrogen by a reaction with steam, and a selective oxidation section for removing a trace amount of carbon monoxide remaining in the shift section by converting it selectively to carbon dioxide by a reaction with oxygen. Alternatively, a device for producing pure hydrogen may be assembled by arranging the reforming section or shift section in combination with a membrane separation hydrogen refining device with a palladium membrane. As described, the hydrogen production device of the present invention may be one with a conventional structure. However, the hydrogen production device preferably has a structure wherein a desulfurization section using the desulfurization system of the present invention is arranged in the prior stage of the reforming section.

An example of the hydrogen production device will be described in more detail. The hydrogen production device may be comprised of a desulfurization section, a reforming section, a shift section and a selective oxidation section. The desulfurization section is as described above.

The reforming section may take a system of either steam reforming reaction or self-heat reforming reaction. There is no particular restriction on the reforming catalyst used in the reforming section. Therefore, the reforming catalyst may be selected from any of those conventionally known as reforming catalysts for hydrocarbon fuels. Examples of the reforming catalysts include those wherein precious metals such as nickel, ruthenium, rhodium and platinum are supported on a suitable support. These metals may be used alone or in combination.

When a steam reforming reaction is employed in the reforming section, the reaction temperature is from 450 to 900° C., preferably from 500 to 850° C., more preferably 550 to 800° C. The amount of steam to be introduced into the reaction system is defined by the ratio of the number of mole of water molecules to the number of mole of carbon contained in a raw hydrocarbon fuel (steam/carbon ratio) and is preferably from 0.5 to 10, more preferably from 1 to 7, more preferably from 2 to 5. Thereupon, the space velocity (WHSV) is defined by A/B wherein A is the flow rate of a hydrocarbon fuel in a liquid state (kg/h) and B is the catalyst weight (kg). The space velocity is set within the range of preferably 0.05 to 20 $h^{-1}$, more preferably 0.1 to 10 $h^{-1}$, more preferably 0.2 to 5 $h^{-1}$.

Whereas, it is also possible to employ a self-heat reforming reaction wherein oxygen, preferably air is introduced into the reforming section and combustion and decomposition reactions are allowed to proceed in the same reactor. In this case, the reaction is usually carried out in the presence of a metallic catalyst typical examples of which metals include the group VIII metals of the periodic table, such as nickel, cobalt, iron, ruthenium, rhodium, iridium and platinum. The amount of steam to be introduced into the reaction system is preferably from 0.3 to 10, more preferably from 0.5 to 5, more preferably from 1 to 3 as defined by the steam/carbon ratio.

In the self-heat reforming, oxygen is added to the raw material in addition to steam. In general, oxygen is added in such an extent that it can generate calorie that can balance the endothermal reaction accompanied with the steam reforming reaction. The amount of oxygen to be added is properly determined depending on heat loss or relation with external heating provided if necessary. The amount is preferably from 0.05 to 1, more preferably from 0.1 to 0.75, more preferably from 0.2 to 0.6 as defined by the ratio of the number of mole of oxygen molecules to the number of mole of carbon contained in a raw hydrocarbon fuel. The reaction temperature of the self-heat reforming reaction is set within the range of 450 to 900° C., preferably 500 to 850° C., more preferably 550 to 800° C. similarly to the steam reforming reaction. Thereupon, the space velocity (WHSV) is selected within the range of preferably 0.1 to 30 $h^{-1}$, more preferably 0.5 to 20 $h^{-1}$, more preferably 1 to 10 $h^{-1}$.

In either case, there is no particular restriction on the pressure for the reforming reaction. However, the pressure is preferably from atmospheric pressure to 2 MPa, more preferably from atmospheric pressure to 0.5 MPa, more preferably from atmospheric pressure to 2 MPa.

The reformed gas generated in the reformer contains, in addition to hydrogen, carbon monoxide, carbon dioxide, methane and steam. When air is supplied as an oxygen source in the self-heat reforming, the reformed gas contains nitrogen as well. In order to enhance the hydrogen concentration or decrease the carbon monoxide concentration because carbon monoxide may be a catalyst poison, the section where carbon monoxide is converted to hydrogen and carbon dioxide by being reacted with water is the shift section. Generally, the reaction proceeds in the presence of a catalyst. The carbon monoxide content (mole % calculated excluding steam) is dropped to preferably 2 mass percent or less, more preferably 1 mass percent or less, more preferably 0.5 mass percent or less using a catalyst containing a mixed oxide of Fe—Cr, a mixed oxide of Zn—Cu or a precious metal such as platinum, ruthenium, or iridium. The shift reaction may be carried out at two stages. In this case, the shift reactor is preferably composed of a high temperature shift reactor and a low temperature shift reactor.

For example, in a proton-exchange membrane fuel cell system, the carbon monoxide concentration is preferably further decreased. Therefore, the outlet gas at the shift reactor is treated in the selective oxidation section. In this step, carbon monoxide is selectively converted to carbon dioxide by adding oxygen in an amount of preferably 0.5 to 10 times mole, more preferably 0.7 to 5 times mole, more preferably 1 to 3 times mole of the number of mole of the remaining carbon monoxide using a catalyst containing iron, cobalt, nickel, ruthenium, rhodium, palladium, osmium, iridium, platinum, copper, silver or gold so that the carbon monoxide concentration is decreased to preferably 10 mass ppm or less. In this case, the carbon monoxide can be decreased by generating methane by reacting with coexistent hydrogen simultaneously with the oxidization of carbon monoxide.

In the fuel cell system of the present invention, hydrogen with less carbon monoxide as prepared above is introduced to the fuel cell to generate electricity. The fuel cell may be of a conventional cell stack of such as proton-exchange membrane fuel cell type (PEFC), phosphoric-acid fuel cell type (PAFC), solid-oxide fuel cell type (SOFC) and molten carbonate fuel cell type (MCFC). Preferred is the proton-exchange membrane fuel cell.

Next, the structure of a proton-exchange membrane fuel cell will be described as an example of the fuel cells.

The proton-exchange membrane fuel cell comprises an anode (fuel pole), a cathode (air pole), and a solid polymer electrolyte sandwiched therebetween. To the anode is supplied a reformed gas containing hydrogen produced through the aforesaid reforming section after being decreased in carbon monoxide concentration through the shift reactor and selective oxidation reactor. To the cathode is supplied an oxygen-containing gas such as air. The gases supplied to the anode and the cathode are introduced after being subjected to a suitable heat treatment if necessary.

Thereupon, a reaction wherein the hydrogen gas becomes protons and releases electrons proceeds at the anode while a reaction wherein the oxygen gas obtains electrons and protons and thus becomes water proceeds at the cathode. In order to facilitate these reactions, platinum black and a Pt or Pt—Ru alloy catalyst with an active carbon support are used for the anode while platinum black and a Pt catalyst with an active carbon support are used for the cathode. Generally, if necessary, both of the catalysts of the anode and the cathode are formed into porous catalyst layers, together with tetrafluoroethylene, a low molecular weight polymer electrolyte membrane material, and active carbon.

Examples of the solid polymer electrolyte include polymer electrolyte membrane known as product names such as Nafion (Du Pont Kabushiki Kaisha), Gore (JGI), Flemion (ASAHI GLASS CO., LTD.) or Aciplex (Asahikasei Corporation). On both sides of the electrolyte is laminated the aforesaid porous catalyst layer thereby forming an MEA (Membrane Electrode Assembly). Further, the MAE is sandwiched by a pair of separators comprising a metal material, graphite, a carbon composite and having a gas feed function, a current collecting function and a draining function, which is important in particular for the cathode, to assemble a fuel cell. An electric load is electrically connected to the anode and the cathode.

EXAMPLES

Hereinafter, the present invention will be described in more details by way of the following examples and comparative examples, which should not be construed as limiting the scope of the invention.

(1) Copper Ion-Exchanged Zeolite Catalyst

An aqueous solution of copper sulfide was prepared by adding 600 ml of distilled water to 32 g of copper sulfate pentahydrate. Next, the solution was mixed with 50 g of an NaY-type zeolite powder with $SiO_2/Al_2O_3$ (molar ratio)=5.5, while being stirred to ion-exchange. Washing with distilled water was carried out so as to remove the remaining sulfuric acid residues. After washing, the resulting product was dried at a temperature of 180° C. in air flow over night. With 30 g of a dried powdery copper ion-exchanged zeolite were mixed 5 g of an alumina binder, and the mixture was extruded to be 1 mmΦ in diameter thereby producing desulfurizing agent (A). The deposited amount of copper in desulfurizing agent (A) was 12 mass percent.

(2) Silver Ion-Exchanged Zeolite Catalyst

An aqueous solution of silver nitrate was prepared by adding 600 ml of distilled water to 30 g of silver nitrate. Next, the solution was mixed with 50 g of an NaY-type zeolite powder with $SiO_2/Al_2O_3$ (molar ratio)=2.5, while being stirred to ion-exchange. Washing with distilled water was carried out so as to remove the remaining nitric acid residues. After washing, the resulting product was dried at a temperature of 180° C. in air flow over night. With 30 g of a dried powdery silver ion-exchanged zeolite were mixed 5 g of an alumina binder, and the mixture was extruded to be 1 mmΦ in diameter thereby producing desulfurizing agent (B). The deposited amount of silver in desulfurizing agent (B) was 24 mass percent.

(3) Performance Test of Desulfurizing Agents

Example 1

Desulfurizing agents A and B each in an amount of 3 ml were filled in an upstream portion and an downstream portion of a circulation type reaction pipe, respectively, and an LP gas (sulfur concentration: about 3 mass ppm) containing methanol and water in the amounts set forth in Table 1 was circulated at a GHSV=9,000 h⁻, normal pressure and normal temperature (25° C.). The sulfur concentrations at the inlet and outlet of the reaction pipe were measured through SCD (Sulfur Chemiluminescence Detector) gas chromatography. The time after the initiation of the experiment till the sulfur concentration of the outlet gas exceeds 20 mass ppb that is detection limit was set forth in Table 1. However, if the sulfur concentration is below the detection limit after 200 hours, it is evaluated as "below detection limit".

Comparative Example 1

Desulfurizing agent performance test was carried out under the same conditions as in Example 1 except that 6 ml of desulfurizing agent (A) were filled into the circulation type reaction pipe. The results are set forth in Table 1.

Comparative Example 2

Desulfurizing agent performance test was carried out under the same conditions as in Example 1 except that 6 ml of desulfurization agent (B) were filled into the circulation type reaction pipe. The results are set forth in Table 1.

It is found from the results set forth in Table 1 that when the copper ion-exchanged Y-type zeolite and silver ion-exchanged Y-type zeolite are arranged upstream and downstream of the system, respectively, resistance to methanol and water is high.

Example 2

A fuel cell system using the desulfurization system of the present invention will be described. FIG. 1 is a schematic view illustrating an example of the fuel cell system of the present invention.

In FIG. 1, a fuel gasified in an LP gas cylinder 3 flows through a pressure reducing valve 4 in a desulfurizer 5 of which upstream is filled with desulfurizing agent (A) and of which downstream is filled with desulfurizing agent (B). Thereupon, the GHSV of the desulfurizer was set to 500 $h^{-1}$. The fuel desulfurized in the desulfurizer 5 is mixed with steam produced from a water tank 1 through a water pump 2 and a vaporizer 6 and fed into a reformer 7 in which 2 mass % of $Ru/Al_2O_3$ were filled as a catalyst. Thereupon, the steam/carbon ratio was set to 3.0. The space velocity WHSV of the circulated raw material was set to 0.5 $h^{-1}$. The reformer reaction pipe is warmed with a burner 18 using fuel from a fuel tank and anode offgas as fuels and adjusted in temperature to 700° C.

The gas containing hydrogen and carbon monoxide thus produced is passed through a high temperature shift reactor 9 with an iron-chrome catalyst, a low temperature shift reactor 10 with a copper-zinc catalyst and a selective oxidation reactor 11 with a ruthenium catalyst in this order so that the carbon monoxide concentration is decreased to such an extent that the characteristics of the fuel cell are not adversely affected.

A proton-exchange membrane fuel cell 17 is composed of an anode 12, a cathode 13, and a solid polymer electrolyte 14. To the anode was supplied the fuel gas containing high purity hydrogen prepared by the above method while to the cathode was supplied air fed from an air blower 8. If necessary, the fuel and air are introduced after being subjected to a suitable humidifying treatment (humidifier is not shown). An electric load 15 is electrically connected to the anode and the cathode.

The anode offgas is discharged after being combusted in a burner 18 and used to warm the reforming pipe. The cathode offgas is discharged through an exhaust 16.

The above-described apparatus was operated using an LP gas containing 1000 mass ppm of methanol, 100 mass ppm of water and 7 mass ppm of sulfur when it is in a liquid state in the LP gas cylinder, as fuel. As the result of analysis of the gas at the anode inlet, the gas contained 72 volume percent of hydrogen (excluding steam).

During the test period (200 hours), the reformer operated normally and no decrease in catalyst activity was recognized. The fuel cell operated normally, and the electric load 15 also operated normally.

The desulfurization system of the present invention enables desulfurizing agents to maintain their performances

TABLE 1

| | Methanol Mass ppm | | | |
| --- | --- | --- | --- | --- |
| | 2000 | 2000 | 500 | 500 |
| Water Mass ppm | 200 | 10 | 200 | 10 |
| Example 1 | Below detection limit | Below detection limit | Below detection limit | Below detection limit |
| Comparative Example 1 | 16 h | 17 h | Below detection limit | Below detection limit |
| Comparative Example 2 | 112 h | Below detection limit | 118 h | Below detection limit | for a long period of time in a state where slight amounts of methanol and moisture are mixed in a hydrocarbon fuel and thus has a significant industrial value.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A desulfurization system for a hydrocarbon fuel comprising a Y-type zeolite-based desulfurizing agent containing at least copper arranged upstream of the system and an X-type zeolite-based desulfurizing agent containing at least silver arranged downstream of the system.

2. The desulfurization system for a hydrocarbon fuel according to claim 1, wherein the zeolite-based desulfurizing agent is produced by depositing copper or silver on a zeolite through ion-exchange.

3. A device for producing hydrogen for a fuel cell system comprising the desulfurization system for a hydrocarbon fuel according to claim 1.

4. A fuel cell system comprising the desulfurization system for a hydrocarbon fuel according to claim 1.

5. The desulfurization system for a hydrocarbon fuel according to claim 1, further comprising a desulfurizing agent selected from the group consisting of nickel, chrome, manganese, cobalt, copper, silver, zinc, and iron.

6. The device for producing hydrogen for a fuel cell system according to claim 3, further comprising a reforming section, a shift section, and a selective oxidation section.

* * * * *

UNITED STATES PATENT AND TRADEMARK OFFICE
CERTIFICATE OF CORRECTION

| | | |
|---|---|---|
| PATENT NO. | : 8,043,989 B2 | Page 1 of 1 |
| APPLICATION NO. | : 12/530110 | |
| DATED | : October 25, 2011 | |
| INVENTOR(S) | : Yoshiyuki Nagayasu et al. | |

It is certified that error appears in the above-identified patent and that said Letters Patent is hereby corrected as shown below:

Title Page, Section (22):

The PC filing date should be -- Mar. 4, 2008 --.

Signed and Sealed this

Twentieth Day of March, 2012

David J. Kappos
*Director of the United States Patent and Trademark Office*

UNITED STATES PATENT AND TRADEMARK OFFICE
CERTIFICATE OF CORRECTION

PATENT NO. : 8,043,989 B2
APPLICATION NO. : 12/530110
DATED : October 25, 2011
INVENTOR(S) : Yoshiyuki Nagayasu et al.

It is certified that error appears in the above-identified patent and that said Letters Patent is hereby corrected as shown below:

Title Page, Section (22):

The PCT filing date should be -- Mar. 4, 2008 --.

This certificate supersedes the Certificate of Correction issued March 20, 2012.

Signed and Sealed this
Ninth Day of October, 2012

David J. Kappos
*Director of the United States Patent and Trademark Office*